(No Model.) 3 Sheets—Sheet 1.

H. L. JACOBS.
METAL WHEEL AND METHOD OF MAKING SAME.

No. 507,908. Patented Oct. 31, 1893.

Attest:
Walter Hamariss
Wm E. Knight.

Inventor:
Henry L. Jacobs.
By Knight Bros
Attorneys.

(No Model.) 3 Sheets—Sheet 2.
H. L. JACOBS.
METAL WHEEL AND METHOD OF MAKING SAME.
No. 507,908. Patented Oct. 31, 1893.

Attest:
Walter Tamariss
Wm. E. Knight.

Inventor:
Henry L. Jacobs.
By Knight Bros.
Attorneys.

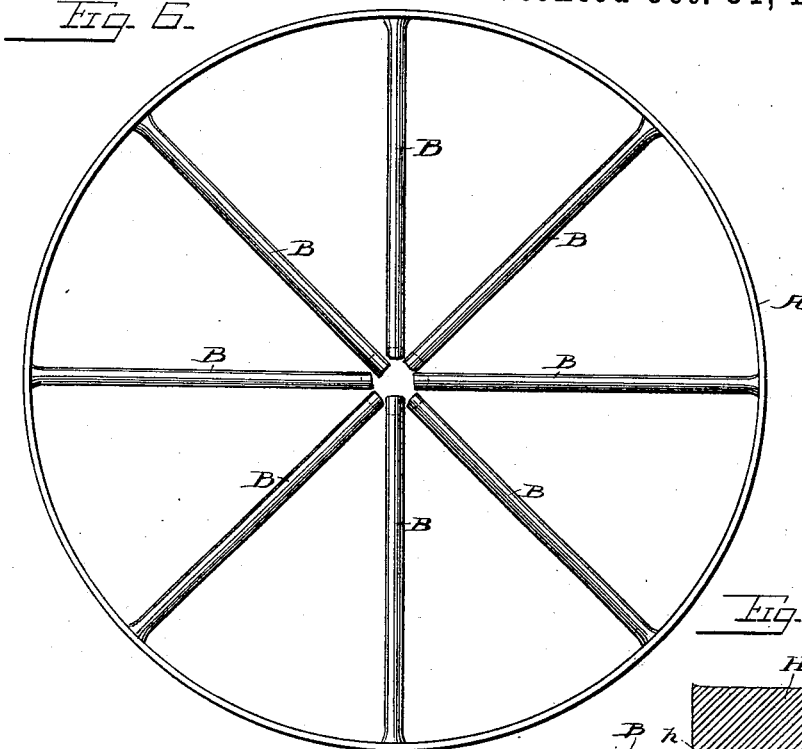
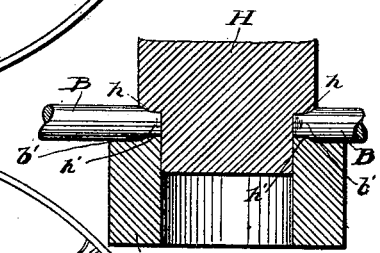
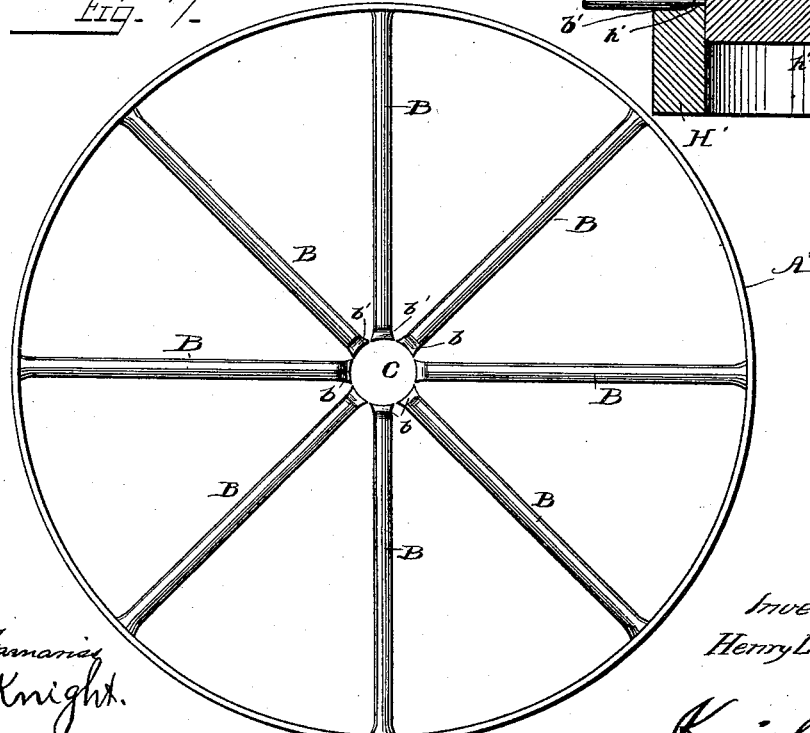

UNITED STATES PATENT OFFICE.

HENRY L. JACOBS, OF COLUMBUS, OHIO.

METAL WHEEL AND METHOD OF MAKING SAME.

SPECIFICATION forming part of Letters Patent No. 507,908, dated October 31, 1893.

Application filed August 13, 1892. Serial No. 443,048. (No model.)

*To all whom it may concern:*

Be it known that I, HENRY L. JACOBS, a citizen of the United States, residing at Columbus, in the county of Franklin and State of Ohio, have invented certain new and useful Improvements in Metal Wheels and Methods of Making the Same, of which the following specification, taken in connection with the accompanying drawings, is a full, clear, and exact description, such as will enable those skilled in the art to make and use the same.

My invention relates to improvements in metal wheels which are particularly adapted for use as wheelbarrow wheels, and has for its object to simplify and strengthen the structure of such wheels.

My improved wheel is formed of a metal rim, a series of spokes riveted to said rim at their outer ends and formed with dove-tailed inner ends, and a sectional hub having the hub extensions formed on one section, corresponding radial grooves in both sections for the reception of the inner dove-tailed ends of the spokes, and rivets or spurs formed integral with one or both sections and adapted to engage in corresponding holes in the other section; one of said sections being adapted to fit over one of the hub extensions on the other section and to be secured thereto by clinching the ends of the rivets or spurs.

The process by which the improved wheel is produced consists in riveting the outer ends of the spokes to the rim and allowing their inner ends to project unevenly toward the center, next cutting out the inner ends of the spokes by means of a stamp or die to make them of equal length and form the central eye and the dovetails on the ends of the spokes, and finally securing the sectional hub in place onto the inner ends of the spokes by passing the hub, formed on one of the sections, through the eye of the spokes and riveting the other hub section thereto.

I will first describe my invention with reference to the accompanying drawings and then more particularly define the novel features in the annexed claims.

Figure 1:
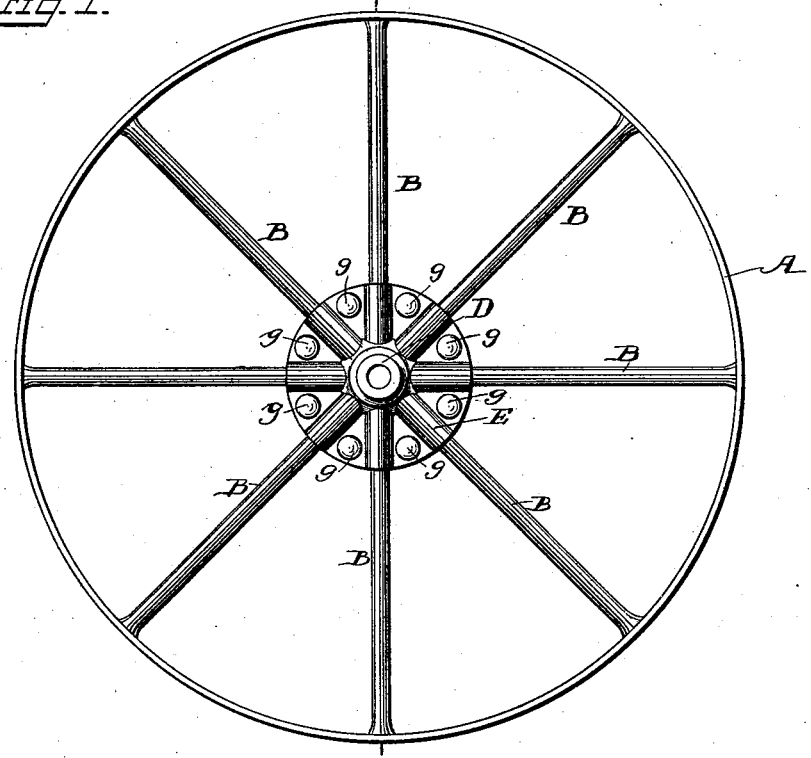
Figure 2:
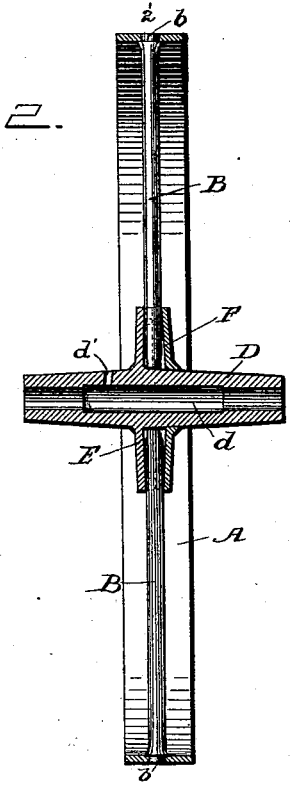
Figure 3:
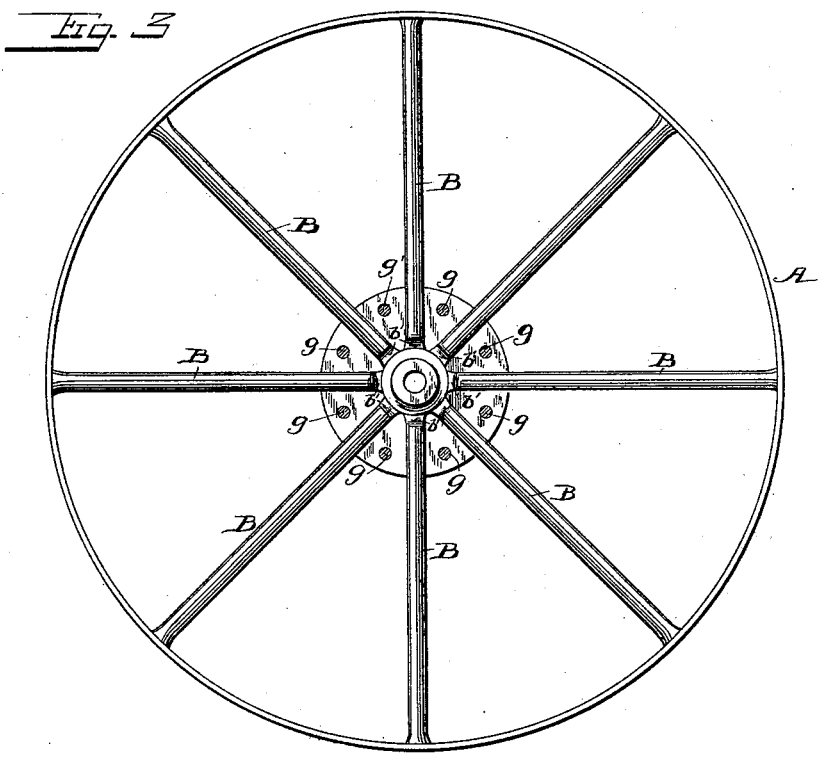
Figure 4:
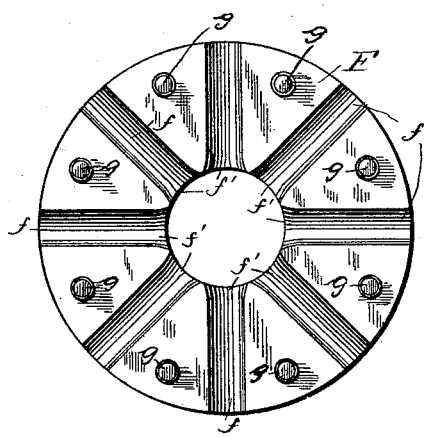
Figure 5:
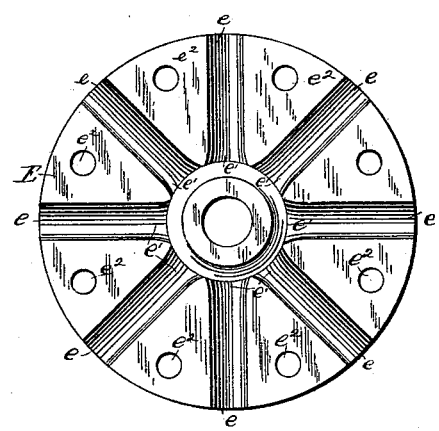

In said drawings:—Figure 1 is a side elevation of my improved metal wheel. Fig. 2 is a longitudinal sectional view taken on the line 2—2 of Fig. 1. Fig. 3 is a side elevation of the wheel with one section of the hub removed, the rivets being shown in section. Figs. 4 and 5 are inside elevations of the hub sections. Figs. 6, 7, and 8 represent the process of making my improved wheel.

Like letters of reference indicate the same parts throughout the several views.

A is the rim of the wheel formed with a series of circular spoke openings in which the outer ends $b$ of the spokes B are riveted by any approved process. The spokes B extend nearly to the center of the wheel where their inner ends $b'$ are arranged to form a circular eye C as shown in Fig. 7; the inner end of each spoke being slightly curved and formed with a flattened dovetail.

D is the hub proper, cored through its length to receive the axle and having an enlarged central oil chamber $d$ which is supplied through the aperture $d'$. Formed integral with the hub D is a circular plate or flange E formed with a series of radial grooves $e$ and circular rivet openings $e^2$. The radial grooves $e$ are abruptly enlarged at their inner ends adjacent to the hub into dove-tails $e'$. It will be observed that the hub D is tapered on both sides of the flange or plate E, and is circular in cross-section.

The hub D fits in the eye C formed at the center of the spokes, the concaved or curved inner ends of the spokes fitting on the tapered periphery of one of the hub extensions, and the spokes resting snugly in the grooves $e$ of the flange E so that the dove-tails $b'$ will engage the dovetail ends $e'$ of the grooves.

F is a circular plate provided with a series of radial grooves $f$ and a series of inwardly projecting rivets or spurs $g$ formed integral therewith, the radial grooves $f$ being enlarged abruptly at their inner ends to form dove-tails $f'$. This plate F corresponds with the circular flange E, and is provided with a central opening F' which fits over the inner hub extension up against the ends of the spokes which rest in the grooves $e$, the dove-tail ends $f$ of the plate F also engaging the dovetail ends of the spokes. When the parts are in position rivets $g$ of the plate F pass through the holes $e^2$ and are clinched so as to hold the parts securely in place. It is quite obvious that the rivets $g$ may be formed integral with either hub section, or if desired some of the rivets may be formed integral with each section, and corresponding holes also formed in each section to receive the rivets.

It will be observed that the inner extension of the hub is longer than the outer extension for the purpose of bringing the wheel centrally on the hub when the parts are all in position.

The sections of hub consist preferably of malleable castings.

A wheel constructed as above has proven to be strong and durable, the dove-tailed ends of the spokes providing tensional as well as torsional strength, and the curved inner ends of the spokes effectively supporting them, on the hub extension. The feature of having the axle opening running entirely through the solid hub is important as it prevents the oil, (which is used to lubricate the axle) from working between the circular plates and spokes, which would cause them to work loose and ruin the wheel.

In making the wheel, I first rivet all of the spokes to the rim, and as it is quite difficult to make all the tires of equal diameters, on account of the variations due to welding them up, and also to make the spokes exactly equal in length, I allow them to project unevenly toward the center, some being a trifle longer than others. Then by means of dies, such as H, H', in Fig. 8, (which are arranged centrally within the rim) I cut off the inner ends of the spokes to make them of equal length and to form the central circular eye C for the reception of the hub extension. The dies are formed with shoulders such as h, h' to flatten the ends of the spokes into curved dovetails at the same operation. By this punching operation a perfect fit can be secured with the hub. The sectional hub is then put in place and all of the rivets or spurs clinched simultaneously for securing the sections together; the tapering inner extension of the hub fitting the inner curved edges of the spokes snugly and straining them outwardly.

By having the rivets formed integral with one of the sections of the hub, the wheel can be put together and all of the rivets clinched in a very short time, rendering the wheel very cheap to manufacture.

Having thus described my invention, the following is what I claim as new therein and desire to secure by Letters Patent:

1. In a metal wheel, the combination of the rim, the spokes riveted thereto at their outer ends and formed with dove-tail inner ends arranged to form a central circular eye, hub sections formed with radial grooves having dove-tail inner ends engaging the inner dove-tail ends of said spokes, and a tapering hub extension formed integral with one of the sections and passing through the eye of the spokes and the central opening of the other hub section, and bearing against the dove-tail ends of the spokes for holding them in place, substantially as set forth.

2. In a metal wheel, the combination of the rim, the spokes riveted thereto at their outer ends and arranged to form a central eye for the passage of the hub, hub sections formed with radial grooves for embracing the spokes, a tapering hub extension formed integral with one hub section and passing through the eye of the spokes and the central opening of the other section, and bearing against the dove-tail ends of the spokes, and rivets or spurs formed integral with one section and adapted to be passed through suitable openings in the other section and be clinched in place, substantially as and for the purpose set forth.

3. In a metal wheel, the combination of the rim, the spokes riveted thereto at their outer ends and formed with dove-tail concave or curved inner ends arranged to form a central circular eye, a hub section composed of a tapering hub extension and bearing against the dove-tail ends of the spokes, and a circular flange or plate, and a hub section formed of a circular plate, one of said hub extensions extending through the eye of the spokes and supporting the curved inner ends of the spokes, and both of said circular plates being formed with dove-tail grooves to engage the dove-tail ends of the spokes, substantially as set forth.

4. The process of making metal wheels which consists in forming the rim with a series of spoke openings, inserting the outer ends of the spokes in said openings, and riveting them in place, stamping or swaging the inner ends of all of the spokes simultaneously and thereby reducing them to the proper lengths and forming enlarged ends thereon, and finally securing a sectional hub formed with tapering grooves to the enlarged ends of said spokes, as set forth.

5. The process of making metal wheels, which consists in forming the rim with a series of spoke openings, inserting the outer ends of the spokes in said openings and riveting them in place, stamping or swaging the inner ends of all of the spokes simultaneously and thereby reducing them to the proper lengths and forming enlarged ends thereon, forming the hub in sections and the rivets or spurs integral with one section, securing the sectional hub in place, and finally clinching all of the rivets or spurs simultaneously for completing the wheel, as set forth.

HENRY L. JACOBS.

Witnesses:
WM. T. McCLURE,
THEODORE M. LIVESAY.